United States Patent
Hidayat et al.

(10) Patent No.: US 11,585,668 B2
(45) Date of Patent: Feb. 21, 2023

(54) SYSTEMS AND METHODS FOR OPTIMAL PATH DETERMINATION USING CONTRACTION HIERARCHIES WITH LINK CONSTRAINTS

(71) Applicant: Verizon Patent and Licensing Inc., Basking Ridge, NJ (US)

(72) Inventors: Jefferson Ray Tan Hidayat, Christchurch (NZ); Nathan M. Robinson, Christchurch (NZ)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 235 days.

(21) Appl. No.: 17/068,502

(22) Filed: Oct. 12, 2020

(65) Prior Publication Data
US 2022/0113152 A1    Apr. 14, 2022

(51) Int. Cl.
*G01C 21/34* (2006.01)
(52) U.S. Cl.
CPC ................ *G01C 21/3461* (2013.01)
(58) Field of Classification Search
CPC .......... G01C 21/3441; G01C 21/3446
See application file for complete search history.

(56) References Cited

U.S. PATENT DOCUMENTS

| | | | | |
|---|---|---|---|---|
| 2011/0113155 A1* | 5/2011 | Kuznetsov | ......... | G01C 21/3446 709/241 |
| 2011/0251789 A1* | 10/2011 | Sanders | ............ | G01C 21/3446 701/533 |
| 2012/0158299 A1* | 6/2012 | Cerecke | ............ | G01C 21/3446 701/533 |
| 2017/0325068 A1* | 11/2017 | Bertelli | ................ | H04W 4/025 |
| 2020/0318981 A1* | 10/2020 | Tyuryutikov | .......... | G01C 21/20 |

\* cited by examiner

*Primary Examiner* — Khoi H Tran
*Assistant Examiner* — Tristan J Greiner

(57) ABSTRACT

A system described herein may provide a technique for the generation of a node map using contraction hierarchy techniques in a manner that accounts for constraints that apply to nodes or links between nodes in the node map. Candidate shortcut links, that represent paths through multiple links in the node map, may be evaluated to determine whether such candidate shortcut links are less restrictive than less costly paths having the same starting and ending nodes as the candidate shortcut links. Candidate shortcut links may be added to the node map in situations where less costly paths are available, but are more restrictive than the shortcut links. At query time, the shortcut links may apply to certain queries having parameters that violate constraints associated with the less costly paths but do not violate any applicable constraints of the shortcut links.

20 Claims, 10 Drawing Sheets

SYSTEMS AND METHODS FOR OPTIMAL PATH DETERMINATION USING CONTRACTION HIERARCHIES WITH LINK CONSTRAINTS

BACKGROUND

Navigation systems may have the ability to generate turn-by-turn navigation directions from arbitrary starting points to arbitrary destinations. Some systems may precompute directions for commonly traveled routes using contraction hierarchies or other similar techniques, in which a set of turns, paths, or the like are contracted into a single "shortcut" that represents the turns, paths, etc. Such precomputed shortcuts may be used when generating particular navigation instructions at "query" time from a particular starting point to a particular destination, thus saving time and processing resources that would be expended after the query is received.

DETAILED DESCRIPTION OF EXAMPLE EMBODIMENTS

Figure 1:
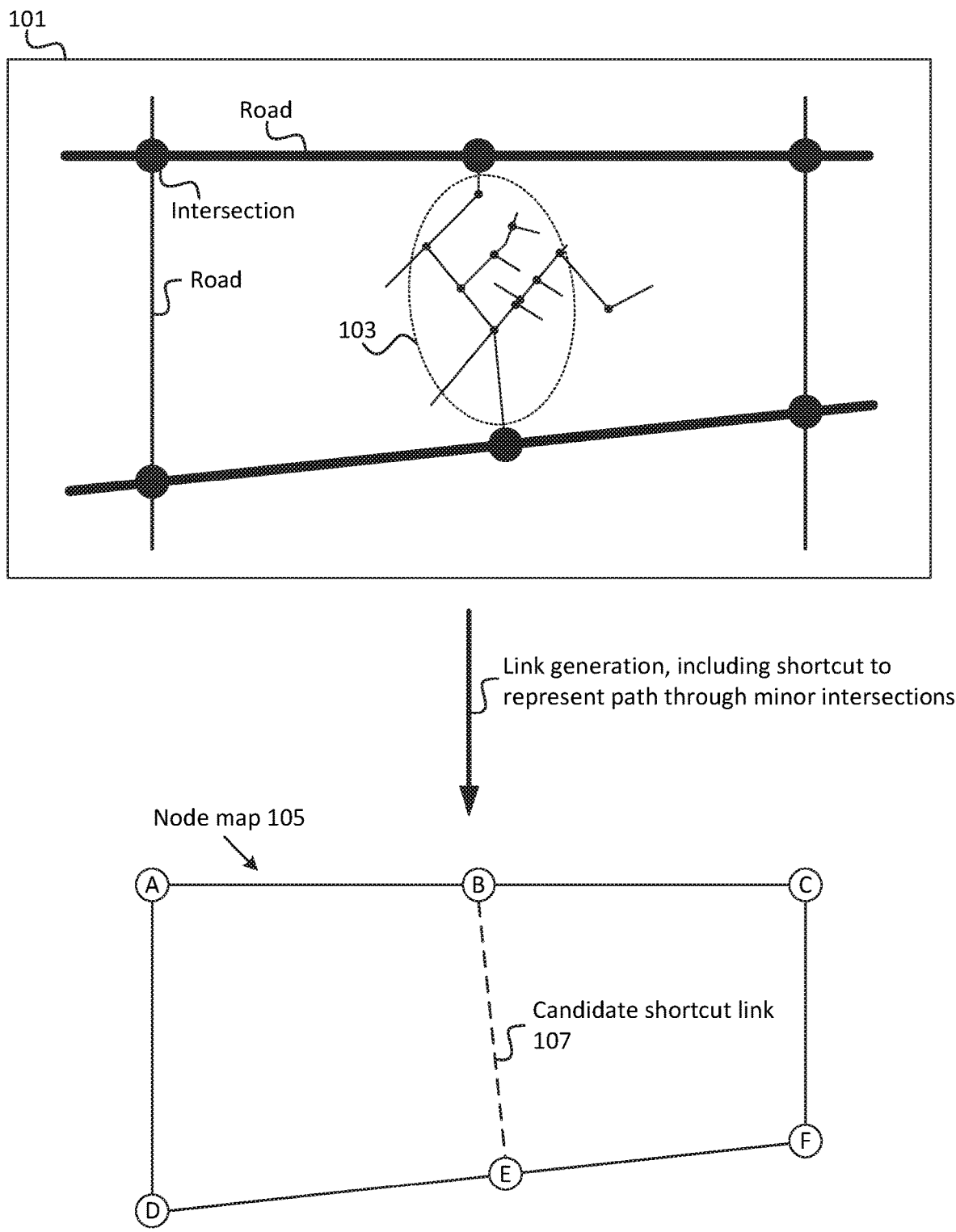
FIG. 1 illustrates an example generation of nodes and links, including a shortcut link that represents a path through multiple nodes, that are based on a set of physical roads and intersections.

The following detailed description refers to the accompanying drawings. The same reference numbers in different drawings may identify the same or similar elements.

Embodiments described herein provide for the identification of constraints on particular links or nodes in a node map, and the selective generation of shortcut links based on such constraints. For example, the node map may include links between respective nodes. The node map may include precomputed "shortcut" links between some nodes, where a shortcut link represents multiple links between multiple nodes. The shortcut link may be added to the node map (e.g., may replace the component nodes and links in the node map, and/or may be added in addition to the component nodes and links), such that when the node map is used for a solution to a query (e.g., a shortest path solution, a lowest cost solution, a set of navigation instructions in response to a navigation request, or the like), the shortcut link may be used in lieu of computing a path through the component nodes and links of the shortcut link.

While adding shortcut links to a node map may reduce processing time and/or resources when the node map is evaluated for a query, the size of the node map (e.g., size of computer files associated with the node map, size of one or more data structures associated with the node map, or the like) may increase to an unmanageable size if too many shortcuts are added. The larger size of the node map may consume a relatively large amount of storage resources, and/or may end up slowing down processing at query time due to the potentially larger data set to be evaluated at query time. Further, the processing time and/or resources to generate a node map may be relatively intensive, and adding excessive or unnecessary shortcut links to the node map may make the node map generation process (e.g., using conditional hierarchies) burdensome or unfeasible depending on hardware constraints. Thus, while it may be useful to include shortcut links in the node map when such shortcut links may be used for queries, limiting the quantity of shortcut links based on some criteria may provide better performance than adding more than a predetermined or dynamic number of shortcut links.

Further, some links may be associated with constraints, which may or may not apply to some queries. For example, in a situation where links on a node map represent roads that may be taken by a vehicle, one link may be associated with a road associated with a bridge, tunnel, or other feature that has constraints on parameters of vehicles that may safely traverse the road. Such constraints may include a height constraint (e.g., a maximum height), a weight constraint, a quantity of axles constraint, or the like. Thus, situations may arise where a shortcut link is a better fit for some vehicles, but not necessarily all vehicles. Embodiments described herein may include such shortcut links in the node map, as well as annotations for links in the node map (including the short links added in accordance with some embodiments) indicating constraints based on which paths that include the shortcut links may be preferable to otherwise lower cost paths (e.g., where "cost" may refer to resources, time, and/or other suitable metrics).

As shown in FIG. 1, for example, map 101 may represent a set of roads and intersections between the roads. In this figure, the intersections are denoted by filled circles on map 101. Map 101 may also include a set of "minor" roads 103. For example, each road and/or intersection may be associated with a score or other measure of "importance," which may be based on factors such as road size, road length, amount of traffic traveling on the road, and/or other attributes.

Some embodiments may generate node map 105 based on map 101 (e.g., based on the roads and/or intersections depicted in map 101), which may include the generation of one or more links representing roads and nodes representing intersections. Further, node map 105 may include one or more shortcut links. In the example here, candidate shortcut link 107 may represent the set of minor roads 103 depicted in map 101. Candidate shortcut link 107 may be determined using contraction hierarchy techniques (e.g., in which minor roads 103 are determined to be candidates for contraction into a shortcut link). For example, candidate shortcut link 107 may be determined based on measures of importance of minor roads 103. Candidate shortcut link 107 may be a "candidate" shortcut link in that embodiments described herein may determine whether candidate shortcut link 107 should ultimately be included in node map 105 or omitted. For example, as discussed below, some embodiments may evaluate constraints associated with candidate shortcut link 107 and one or more other links or paths between links to determine whether potential situations may exist where candidate shortcut link 107 is included in an appropriate path for a potential query, and/or where candidate shortcut link 107 is not included in an appropriate path for other potential queries.

Figure 2:
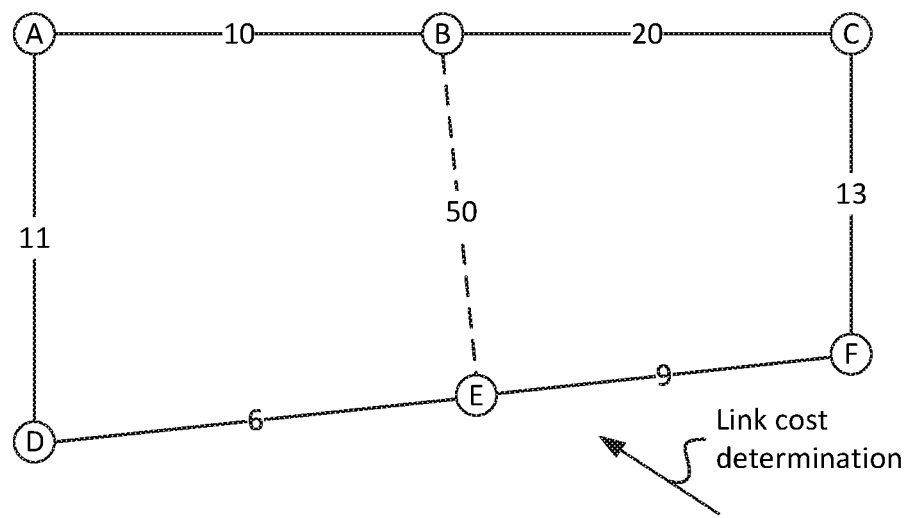
FIG. 2 illustrates example "costs" associated with the example links.

As noted above, as shown in FIG. 2, each link may be associated with a "cost," which may represent time spent traversing the link, resources spent traversing the link (e.g., fuel in situations where the link represents a physical road, electricity in situations where the link represents a pipeline through which fluid is pumped, etc.), or other suitable metrics that may be reflected by a cost, score, or the like. For example, as shown in FIG. 2, the cost of the link between Node A and Node B (referred to herein using the notation "Link(AB)") is 10, the cost of Link(BC) is 20, the cost of candidate shortcut link 107 (e.g., Link(BE)) is 50 and so on.

Figure 3:
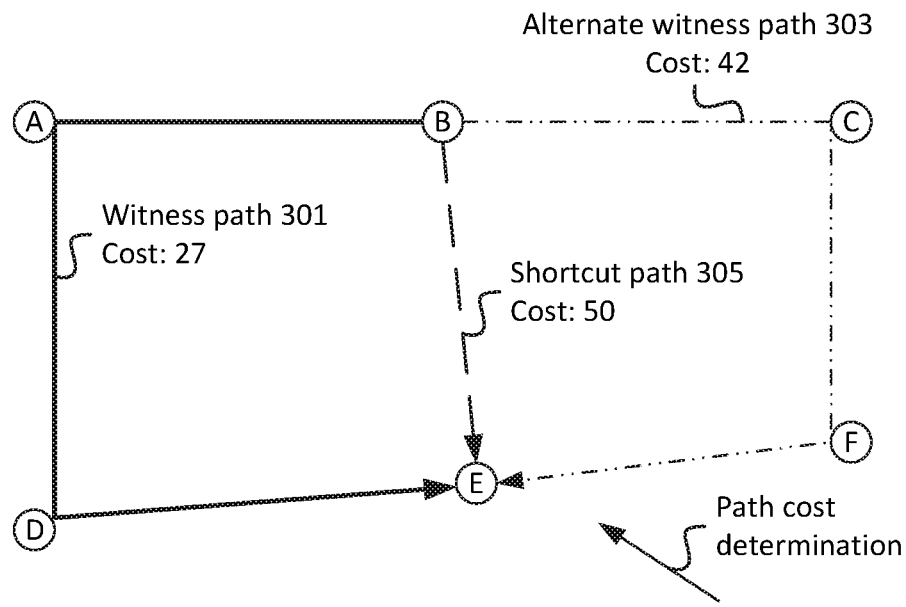
FIG. 3 illustrates an example identification of "witness" paths that serve as lower cost alternatives to a path through the shortcut link.

As shown in FIG. 3, contraction hierarchy techniques may include the determination of whether one or more "witness paths" exist for candidate shortcut link 107. For example, several paths from Node B to Node E are determined. As referred to herein, a "path" includes a starting node, an ending node, and one or more links. One or more of the paths, referred to herein as a "shortcut paths," may include only candidate shortcut link 107. Further, one or more "witness paths" may be identified, where a witness path refers to a path through the node map that has the same starting node and ending node as a shortcut path (or candidate shortcut path), and that also has a lower cost than the shortcut path. In some embodiments, a witness path may not include a shortcut link. In the example of FIG. 3, the shortcut path includes only Link(BE)—that is, a path directly from Node B to Node E. In practice, similar concepts may apply when evaluating a path in the other direction along Link (BE), which may be a path directly from Node E to Node B.

In some embodiments, candidate shortcut links may be evaluated in a unidirectional manner. For example, in some embodiments, a candidate shortcut link may be added to the node map if the evaluation of the candidate shortcut link, as described herein, only indicates that the shortcut link applies in one direction (but not all directions). For the sake of brevity, only one direction (i.e., from Node B to Node E) is described herein.

In this example, witness path 301, which traverses Node B, Node A, Node D, and then Node E (referred to herein using the notation "Path(BADE)") may have a cost of 27. That is, Path(BADE) may have component links Link(BA), Link(AD), and Link (DE). Referring to the example costs shown in FIG. 2, the respective link costs of these links are 10, 11, and 6, resulting in path cost of 27 for witness path 301 (10+11+6). In the examples herein, path costs are computed by adding link costs of component links. In practice, other techniques for computing paths costs may be used.

In the examples herein, path costs are computed by adding link costs of component links. In practice, other techniques for computing paths costs may be used. Further, in this example, it is assumed that link costs apply in both directions. In practice, links may have different costs for different directions, and similar concepts may be applied when evaluating such links in different directions. For example, in some scenarios, Link(AB) may have a cost of 10 in one direction, and a cost of 15 in the other direction. In other words, Path(AB) may have an example path cost of 10, while Path(BA) may have an example path cost of 15. In such scenarios, a path cost may be computed by adding path costs of component paths. For example, the cost of Path(BADE) may be based in part on the path cost of Path(BA), but not based on the path cost of Path(AB).

Continuing with the example of FIG. 3, alternate witness path 303, which traverses Path(BCDFE), may have a path cost of 42, and shortcut path 305 may have a path cost of 50 (e.g., the same cost as Link(BE) or of Path(BE), in situations where Path(BE) and Path(EB) have different costs). Thus, as witness path 301 and alternate witness path 303 each have a lower cost than shortcut path 305, witness path 301 and alternate witness path 303 may be considered as valid witness paths for shortcut path 305. That is, as similarly noted above, witness path 301 and alternate witness path 303 may each share the same start and end points with shortcut path 305, and may each be associated with a lower cost than shortcut path 305. Alternate witness path 303 may be an "alternate" witness path, in that the cost of alternate witness path 303 is lower than witness path 301. In some embodiments, only one witness path may be determined. For example, processing may continue to evaluating other candidate shortcut links once a witness path is found for shortcut path 305. In some embodiments, multiple witness paths may be attempted to be found for a given shortcut link.

Generally, a determination of at least one witness path for a shortcut link (e.g., for one or more shortcut paths that include the shortcut link, which may include different directions of traversing the same link) may indicate that the shortcut link should be omitted from the node map. For example, the determination of the witness path may indicate that the shortcut link is unlikely to ever be used for a query, as the witness path is by definition a lower cost than the shortcut link. However, as noted above, situations may arise in which constraints associated with a witness path may make the witness path untraversable for some queries, while being traversable for other queries.

Figure 4:
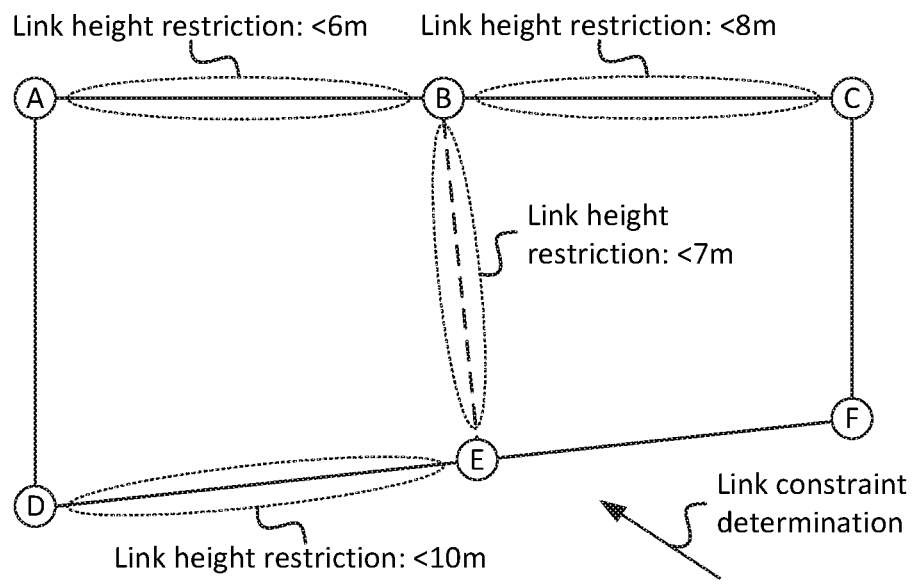
FIG. 4 illustrates example constraints that may be associated with particular ones of the example links.

For example, in embodiments where the node map corresponds to a system that provides navigation instructions, some queries may include vehicle attributes such as height, weight, quantity of axles, hazardous material cargo, and/or other attributes. Further, constraints on particular links, such as links included in one or more witness paths for one or more shortcut links, may include constraints or restrictions on such attributes. For example, as shown in FIG. 4, Link(AB) may be associated with a maximum vehicle height of 6 meters ("m"), Link(BC) may be associated with a maximum vehicle height of 8 m, and so on. As similarly noted above, the constraints may apply in a bidirectional manner. In some embodiments, the constraints may apply in a unidirectional manner, such as the 6 m height restriction associated with Link(AB), from Node A to Node B, may not apply to Link(BA), from Node B to Node A. For the sake of brevity, such constraints are described herein as applying in a bidirectional manner.

In practice, multiple-criteria constraints, which may include Boolean or other logical operators or functions, may be applied. Further, constraints may be based on any suitable factor in lieu of, or in addition to, maximum height. For example, a link may be associated with a maximum height and a maximum weight (e.g., using a logical "AND" operator). As another example, a link may be associated with a maximum weight or a maximum quantity of axles (e.g., using a logical "OR" operator). For the sake of brevity, only single-criteria constraints based on height are discussed herein.

Figure 5:
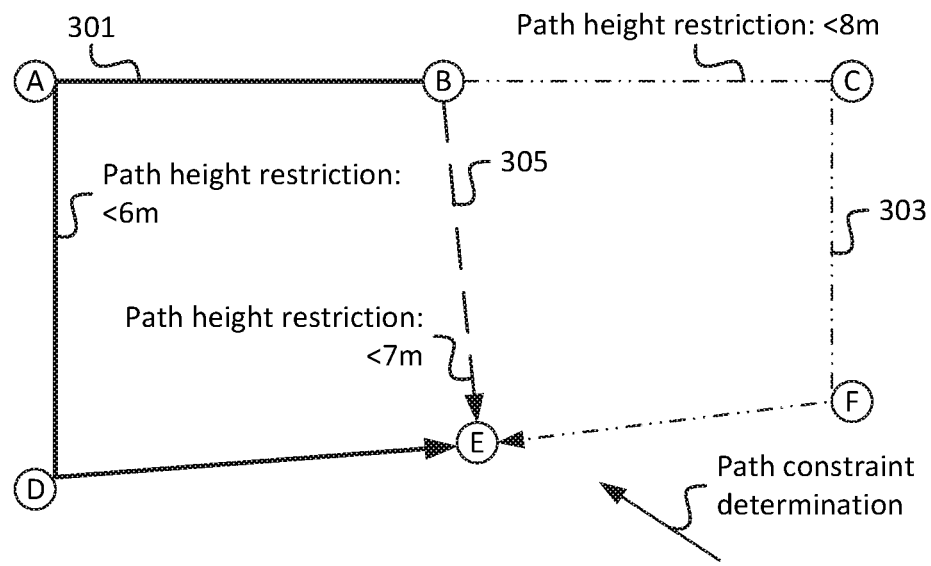
FIG. 5 illustrates example constraints of paths that may be determined based on constraints of links included in the paths.

In some embodiments, constraints associated with component links of paths may be "subsumed" into constraints associated with the paths. Subsuming constraints, as discussed herein, may include the association of one or more constraints, of component links of a path, with the path itself. For example, as shown in FIG. 5, example witness paths 301 and 303 (i.e., Path(BADE) and Path(BCFE)) may be associated with the "most restrictive" constraints of their component links. As discussed herein, a first set of constraints may be "more restrictive" than a second set of constraints if criteria of the first set of constraints (e.g., a maximum vehicle height) may be violated while criteria of the second set of constraints are not violated.

For example, the constraints associated with Link(AB) may be more restrictive than the constraints associated with Link(DE), as a vehicle that is 9 m in height would violate the 6 m maximum height associated with Link(AB) while not violating the 10 m maximum height associated with Link (DE). Thus, the constraint associated with Link(DE) is subsumed by the constraint associated with Link(AB), and only the constraint associated with Link(AB) is associated with Path(BADE). Thus, as shown in FIG. 5, the constraints for witness path 301 include a 6 m height restriction, the constraints for alternate witness path 303 include an 8 m height restriction, and the constraints for shortcut path 305 include a 7 m height restriction.

Figure 6:
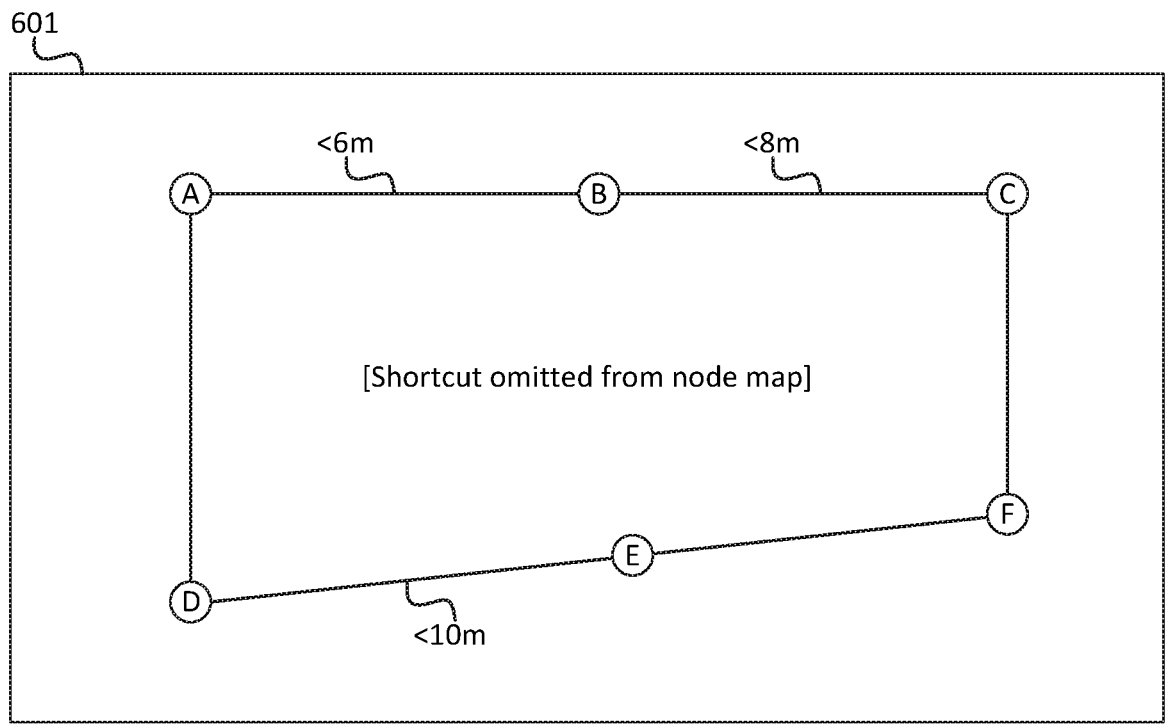
FIG. 6 illustrates an example elimination of a shortcut link from a node map based on a determination that one or more witness paths for the shortcut link are less restrictive than the shortcut link.

In accordance with some embodiments, as shown in FIG. 6, a resulting node map 601 may omit candidate shortcut link 107. While not explicitly shown in FIG. 6, the component nodes and paths that make up candidate shortcut link 107 may be included in node map 601. Such component nodes and paths are not shown in this figure to more clearly highlight the omission of candidate shortcut link 107 from node map 601.

Referring to the example restrictions shown in FIG. 5, at least one witness path exists for candidate shortcut link 107 that is less restrictive than shortcut path 305, which includes only candidate shortcut link 107. That is, while witness path 301 is more restrictive than shortcut path 305 and may therefore not be an eligible path to include in response to queries for certain vehicles, alternate witness path 303 is less restrictive than shortcut path 305. That is, any set of parameters that would satisfy (e.g., not violate) the constraints of shortcut path 305 would also not satisfy the constraints of alternate witness path 303. Since alternate witness path 303 is a lower cost path then shortcut path 305 and is less restrictive than shortcut path 305, alternate witness path 303 would always (or virtually always) be selected as a path in favor of shortcut path 305 in response to a query. Further, in situations where a query includes parameters that satisfy (e.g., do not violate) the constraints of witness path 301, witness path 301 would always (or virtually always) be selected as a path in favor of alternate witness path 303 and shortcut path 305.

As described above, such lower cost paths and/or less restrictive paths may "always" or "virtually always" be selected in embodiments where path cost is a determining factor. In practice, other factors may be used in ultimately selecting a path, and/or other techniques may be used to select one or more paths in response to a query that includes particular parameters (e.g., starting point, destination, vehicle height, vehicle weight, and/or other parameters).

Figure 7:
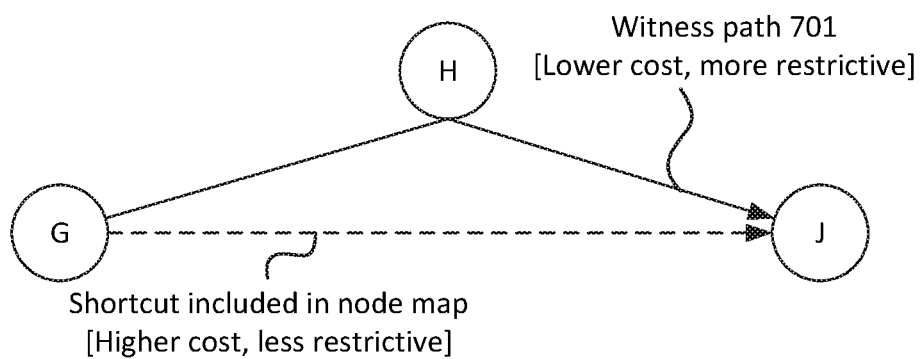
FIG. 7 illustrates an example inclusion of the shortcut link in the node map based on a determination that no witness paths that are less restrictive than the shortcut link exist.

FIG. 7 illustrates, on the other hand, an example scenario in which a witness path exists for a shortcut link, but the witness path is more restrictive than the shortcut link. For example, witness path 701 (i.e., Path(GHJ)) may be a witness path for shortcut Link(GJ), as witness Path(GHJ) may have a lower cost than shortcut Path(GJ). As noted above, a similar analysis may be performed to determine that the same is true in the opposite direction (e.g., witness Path(JHG) as compared to shortcut Path(JG)), and/or for one or more other witness paths for Link(GJ). However, as with the examples above, this example is provided in the context of one direction, from Node G to Node J.

In this example, witness path 701 may be more restrictive than shortcut Path(GJ). That is, some constraints of witness path 701 may be violated by query attributes (e.g., vehicle attributes such as height, weight, etc.) that would not violate constraints of shortcut Path(GJ). In accordance with some embodiments, Link(GJ) may be included in a node map. Further, in some embodiments, the node map may include the constraints for each link, including applicable constraints for shortcut links. For example, as similarly noted above, the constraints for the shortcut links may include subsumed constraints of the various component links of the shortcut links.

Figure 8:
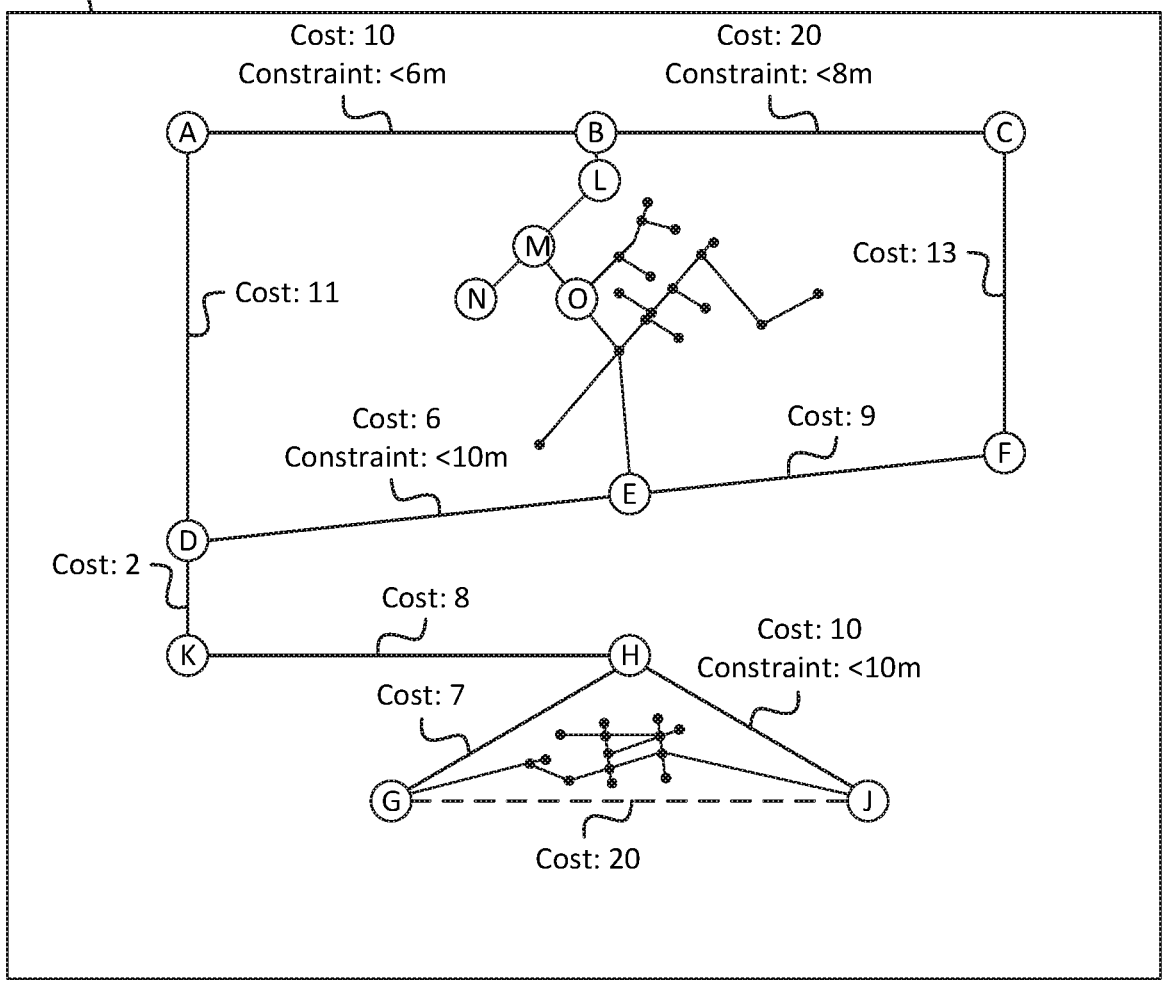
FIG. 8 illustrates an example node map, including conditional shortcut links, that may be generated in accordance with some embodiments.

FIG. 8 illustrates an example node map 801 with conditional shortcut links as well as constraints for such conditional shortcut links. Further node map 801 may include constraints for one or more other links (e.g., non-shortcut links). Node map 801 may reflect, for example, the physical roads and intersections shown in map 101. Such physical roads and intersections may be associated with, for example, Nodes A-F and L-O. Additionally, while some of the nodes for intersections of minor roads 103 are not explicitly labeled in FIG. 8 for the sake of clarity, in practice, node map 801 may include similar indications of such nodes. The small black circles in the portion of the figure corresponding to minor roads 103 may reflect, for example, the intersections and minor roads 103 shown in map 101. Node map 801 may further include example Nodes G, H, and J, shown in FIG. 7. Additionally, node map 801 may include component nodes represented by the shortcut Link(GJ) and/or other nodes representing intersections between roads, where such nodes are also indicated by small black circles.

As further shown in FIG. 8, node map 801 may include one or more shortcut links, such as shortcut Link(GJ). As noted above, shortcut Link(GJ) may be a "conditional shortcut link," in that shortcut Link(GJ) may be applicable in some scenarios, while being inapplicable in other scenarios. For example, as noted above, a witness path (e.g., witness path 701, Path(GHJ)) may exist for shortcut Link(GJ) (e.g., for Path(GJ)), but such witness path 701 may be more restrictive than shortcut Link(GJ). Thus, shortcut Link(GJ) may be considered as a conditional shortcut link, as shortcut Link(GJ) may apply to some queries, while the lower cost witness path 701 may apply to other queries. As noted above, such queries may include, for example, attributes of vehicles for which navigation instructions are sought, and the constraints may include parameters of vehicles or other parameters based on which certain vehicles may traverse certain roads or intersections, and/or parameters based on which such roads or intersections may be impassable by such vehicles.

While FIG. 8 depicts only one conditional shortcut link (i.e., Link(GJ)), in practice, node map 801 may include multiple conditional shortcut links. Further, in some embodiments, node map 801 may include one or more shortcut links that are not conditional shortcut links. For example, such "non-conditional shortcut links" may include shortcut links for which no witness paths exist under any criteria. That is, such shortcut links may include the lowest cost path or paths between given sets of nodes.

As further shown, node map 801 may include costs associated with links between nodes, including costs of shortcut links (e.g., the example cost 20 for conditional shortcut Link(GJ)). As discussed above, costs may reflect time or other resources associated with traversing a given link.

As noted above, costs may be computed in one direction or in multiple directions. For example, the "cost" indicated for shortcut Link(GJ) may be the cost of Path(GJ)—that is, the path from Node G to Node J—and the cost for Path(JG) may be a different cost. In some embodiments, the "cost" indicated in node map 801 may reflect the cost of traversing the link in either direction. In some embodiments, the "cost" indicated in node map 801 may reflect the cost of traversing the link in one direction, in which case multiple costs may be provided per link. For the sake of clarity, only one cost is shown in the figure per link. Further, and also for the sake of clarity, some of the links are shown in the figure without costs. In practice, node map 801 may reflect costs for such links as well.

Additionally, node map 801 may include constraints associated with respective links, where applicable. For example, Link(HJ) may be associated with a constraint indicating that vehicles traversing the link must be 10 m or shorter, Link (CF) may be associated with a constraint indicating that vehicles traversing the link must be 13 m or shorter, and so on. Further, some links, such as Link(DK) and conditional shortcut Link(GJ) may not be associated with any constraints. As discussed below, when evaluating node map 801 against a query, such as a request for navigation instructions for a particular vehicle with particular attributes from a starting point to a destination, the costs of links (e.g., actual links associated with actual roads as well as shortcut links) and their associated constraints may be factors based on which the query is fulfilled. For example, navigation directions may be determined based on cost, such as a lowest possible cost, and query constraints (e.g., a path that allows a vehicle having particular parameters to traverse the path).

Figure 9:
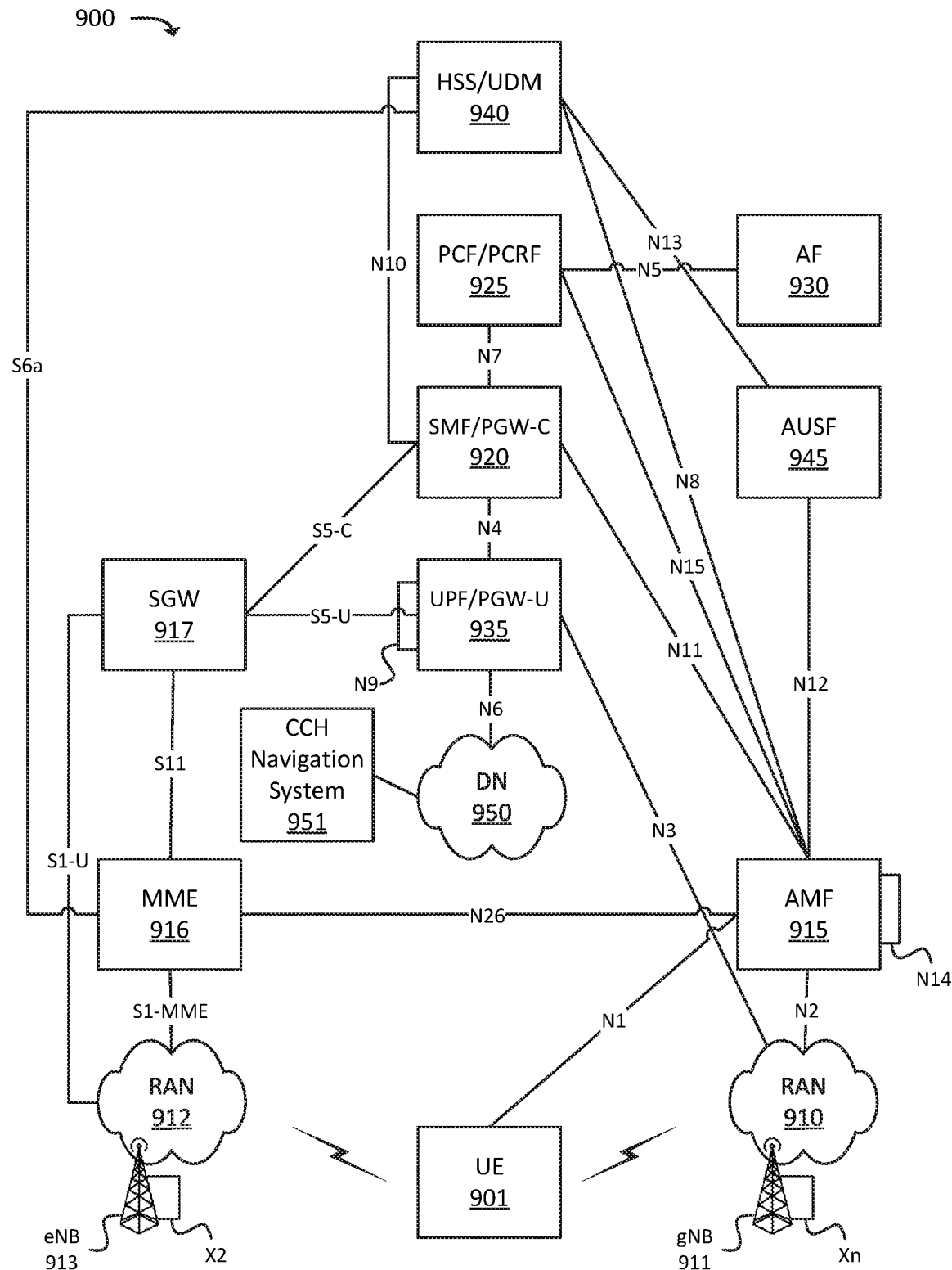
FIG. 9 illustrates an example environment in which one or more embodiments, described herein, may be implemented.

FIG. 9 illustrates an example environment 900, in which one or more embodiments may be implemented. In some embodiments, environment 900 may correspond to a Fifth Generation ("5G") network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 900 may include UE 901, RAN 910 (which may include one or more Next Generation Node Bs ("gNBs") 911), RAN 912 (which may include one or more one or more evolved Node Bs ("eNBs") 913), and various network functions such as Access and Mobility Management Function ("AMF") 915, Mobility Management Entity ("MME") 916, Serving Gateway ("SGW") 917, Session Management Function ("SMF")/Packet Data Network ("PDN") Gateway ("PGW")-Control plane function ("PGW-C") 920, Policy Control Function ("PCF")/Policy Charging and Rules Function ("PCRF") 925, Application Function ("AF") 930, User Plane Function ("UPF")/PGW-User plane function ("PGW-U") 935, Home Subscriber Server ("HSS")/Unified Data Management ("UDM") 940, and Authentication Server Function ("AUSF") 945. Environment 900 may also include one or more networks, such as Data Network ("DN") 950. Environment 900 may include one or more additional devices or systems communicatively coupled to one or more networks (e.g., DN 950), such as Conditional Contraction Hierarchy ("CCH") Navigation System 951.

The example shown in FIG. 9 illustrates one instance of each network component or function (e.g., one instance of SMF/PGW-C 920, PCF/PCRF 925, UPF/PGW-U 935, HSS/UDM 940, and/or 945). In practice, environment 900 may include multiple instances of such components or functions. For example, in some embodiments, environment 900 may include multiple "slices" of a core network, where each slice includes a discrete set of network functions (e.g., one slice may include a first instance of SMF/PGW-C 920, PCF/PCRF 925, UPF/PGW-U 935, HSS/UDM 940, and/or 945, while another slice may include a second instance of SMF/PGW-C 920, PCF/PCRF 925, UPF/PGW-U 935, HSS/UDM 940, and/or 945). The different slices may provide differentiated levels of service, such as service in accordance with different Quality of Service ("QoS") parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. Alternatively, or additionally, one or more of the devices of environment 900 may perform one or more network functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900.

UE 901 may include a computation and communication device, such as a wireless mobile communication device that is capable of communicating with RAN 910, RAN 912, and/or DN 950. UE 901 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to- Mobile ("M2M") device, or another type of mobile computation and communication device. UE 901 may send traffic to and/or receive traffic (e.g., user plane traffic) from DN 950 via RAN 910, RAN 912, and/or UPF/PGW-U 935.

RAN 910 may be, or may include, a 5G RAN that includes one or more base stations (e.g., one or more gNBs 911), via which UE 901 may communicate with one or more other elements of environment 900. UE 901 may communicate with RAN 910 via an air interface (e.g., as provided by gNB 911). For instance, RAN 910 may receive traffic (e.g., voice call traffic, data traffic, messaging traffic, signaling traffic, etc.) from UE 901 via the air interface, and may communicate the traffic to UPF/PGW-U 935, and/or one or more other devices or networks. Similarly, RAN 910 may receive traffic intended for UE 901 (e.g., from UPF/PGW-U 935, AMF 915, and/or one or more other devices or networks) and may communicate the traffic to UE 901 via the air interface.

RAN 912 may be, or may include, a LTE RAN that includes one or more base stations (e.g., one or more eNBs 913), via which UE 901 may communicate with one or more other elements of environment 900. UE 901 may communicate with RAN 912 via an air interface (e.g., as provided by eNB 913). For instance, RAN 910 may receive traffic (e.g., voice call traffic, data traffic, messaging traffic, signaling traffic, etc.) from UE 901 via the air interface, and may communicate the traffic to UPF/PGW-U 935, and/or one or more other devices or networks. Similarly, RAN 910 may receive traffic intended for UE 901 (e.g., from UPF/PGW-U 935, SGW 917, and/or one or more other devices or networks) and may communicate the traffic to UE 901 via the air interface.

AMF 915 may include one or more devices, systems, Virtualized Network Functions ("VNFs"), etc., that perform operations to register UE 901 with the 5G network, to establish bearer channels associated with a session with UE 901, to hand off UE 901 from the 5G network to another network, to hand off UE 901 from the other network to the 5G network, manage mobility of UE 901 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, etc., that perform operations to register UE 901 with the EPC, to establish bearer channels associated with a session with UE 901, to hand off UE 901 from the EPC to another network, to hand off UE 901 from another network to the EPC, manage mobility of UE 901 between RANs 912 and/or eNBs 913, and/or to perform other operations.

SGW 917 may include one or more devices, systems, VNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, etc., that gather, process, store, and/or provide information in a manner described herein. SMF/PGW-C 920 may, for example, facilitate in the establishment of communication sessions on behalf of UE 901. In some embodiments, the establishment of communications sessions may be performed in accordance with one or more policies provided by PCF/PCRF 925.

PCF/PCRF 925 may include one or more devices, systems, VNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, etc., that receive, store, and/or provide information that may be used in determining parameters (e.g., quality of service parameters, charging parameters, or the like) for certain applications.

UPF/PGW-U 935 may include one or more devices, systems, VNFs, etc., that receive, store, and/or provide data (e.g., user plane data). For example, UPF/PGW-U 935 may receive user plane data (e.g., voice call traffic, data traffic, etc.), destined for UE 901, from DN 950, and may forward the user plane data toward UE 901 (e.g., via RAN 910, SMF/PGW-C 920, and/or one or more other devices). In some embodiments, multiple UPFs 935 may be deployed (e.g., in different geographical locations), and the delivery of content to UE 901 may be coordinated via the N9 interface (e.g., as denoted in FIG. 9 by the line marked "N9" originating and terminating at UPF/PGW-U 935). Similarly, UPF/PGW-U 935 may receive traffic from UE 901 (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

HSS/UDM 940 and AUSF 945 may include one or more devices, systems, VNFs, etc., that manage, update, and/or store, in one or more memory devices associated with AUSF 945 and/or HSS/UDM 940, profile information associated with a subscriber. AUSF 945 and/or HSS/UDM 940 may perform authentication, authorization, and/or accounting operations associated with the subscriber and/or a communication session with UE 901.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 901 may communicate, through DN 950, with data servers, other UEs 901, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 901 may communicate.

CCH Navigation System 951 may include one or more devices, systems, VNFs, etc. that perform one or more operations described herein. For example, CCH Navigation System 951 may generate one or more node maps based on one or more maps or other information associated with physical roads and intersections between the roads. In some embodiments, CCH Navigation System 951 may generate node maps based on other information, and/or for systems other than roadways. In some embodiments, CCH Navigation System 951 may generate node maps using contraction hierarchy techniques, including techniques described herein whereby CCH Navigation System 951 includes conditional shortcut links in the node maps. CCH Navigation System 951 may further include constraints associated with such conditional shortcut links and/or other links in the node map. In some embodiments, CCH Navigation System 951 may receive queries, based on which CCH Navigation System 951 may generate or determine one or more paths through the node map. The queries may include attributes based on which CCH Navigation System 951 may evaluate the constraints associated with the node map, such as attributes of a vehicle for which the query is associated.

Figure 10:
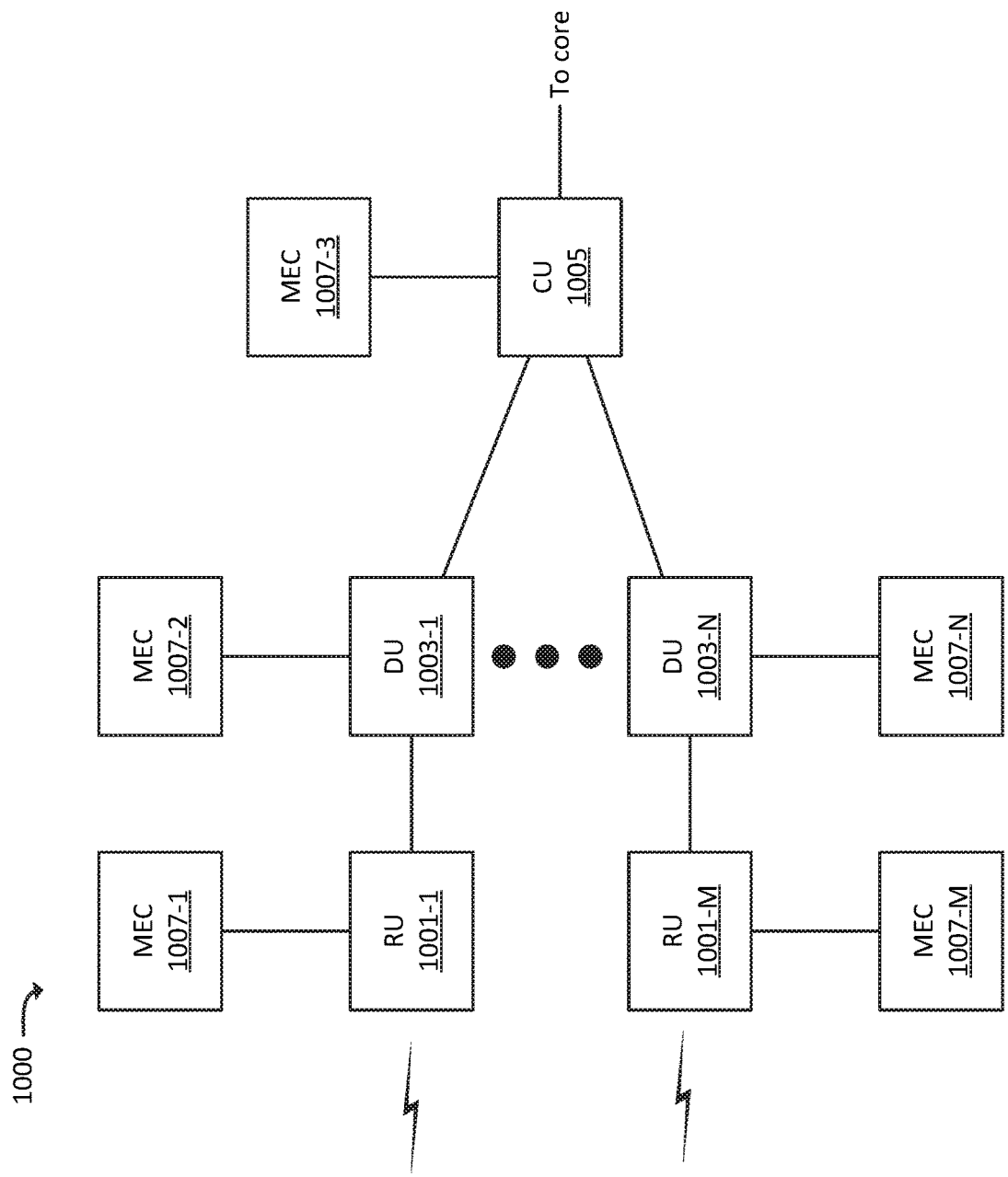
FIG. 10 illustrates an example arrangement of a radio access network ("RAN"), in accordance with some embodiments.

FIG. 10 illustrates an example Distributed Unit ("DU") network 1000, which may be included in and/or implemented by one or more RANs (e.g., RAN 910, RAN 912, or some other RAN). In some embodiments, a particular RAN may include one DU network 1000. In some embodiments, a particular RAN may include multiple DU networks 1000. In some embodiments, DU network 1000 may correspond to a particular gNB 911 of a 5G RAN (e.g., RAN 910). In some embodiments, DU network 1000 may correspond to multiple gNBs 911. In some embodiments, DU network 1000 may correspond to one or more other types of base stations of one or more other types of RANs. As shown, DU network 1000 may include Central Unit ("CU") 1005, one or more Distributed Units ("DUs") 1003-1 through 1003-N (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 915 and/or UPF/PGW-U 935). In the uplink direction (e.g., for traffic from UEs 901 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 901, and may determine which DU(s) 1003 should receive the downlink traffic. DU 1003 may include one or more devices that transmit traffic between a core network (e.g., via CU 1005) and UE 901 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 901.

RU 1001 may include hardware circuitry (e.g., one or more RF transceivers, antennas, radios, and/or other suitable hardware) to communicate wirelessly (e.g., via an RF interface) with one or more UEs 901, one or more other DUs 1003 (e.g., via RUs 1001 associated with DUs 1003), and/or any other suitable type of device. In the uplink direction, RU 1001 may receive traffic from UE 901 and/or another DU 1003 via the RF interface and may provide the traffic to DU 1003. In the downlink direction, RU 1001 may receive traffic from DU 1003, and may provide the traffic to UE 901 and/or another DU 1003.

RUs 1001 may, in some embodiments, be communicatively coupled to one or more Multi-Access/Mobile Edge Computing ("MEC") devices, referred to sometimes herein simply as ("MECs") 1007. For example, RU 1001-1 may be communicatively coupled to MEC 1007-1, RU 1001-M may be communicatively coupled to MEC 1007-M, DU 1003-1 may be communicatively coupled to MEC 1007-2, DU 1003-N may be communicatively coupled to MEC 1007-N, CU 1005 may be communicatively coupled to MEC 1007-3, and so on. MECs 1007 may include hardware resources (e.g., configurable or provisionable hardware resources) that may be configured to provide services and/or otherwise process traffic to and/or from UE 901, via a respective RU 1001.

For example, RU 1001-1 may route some traffic, from UE 901, to MEC 1007-1 instead of to a core network (e.g., via DU 1003 and CU 1005). MEC 1007-1 may process the traffic, perform one or more computations based on the received traffic, and may provide traffic to UE 901 via RU 1001-1. In this manner, ultra-low latency services may be provided to UE 901, as traffic does not need to traverse DU 1003, CU 1005, and an intervening backhaul network between DU network 1000 and the core network. In some embodiments, MEC 1007 may include, and/or may implement some or all of the functionality described above with respect to CCH Navigation System 951.

Figure 11:
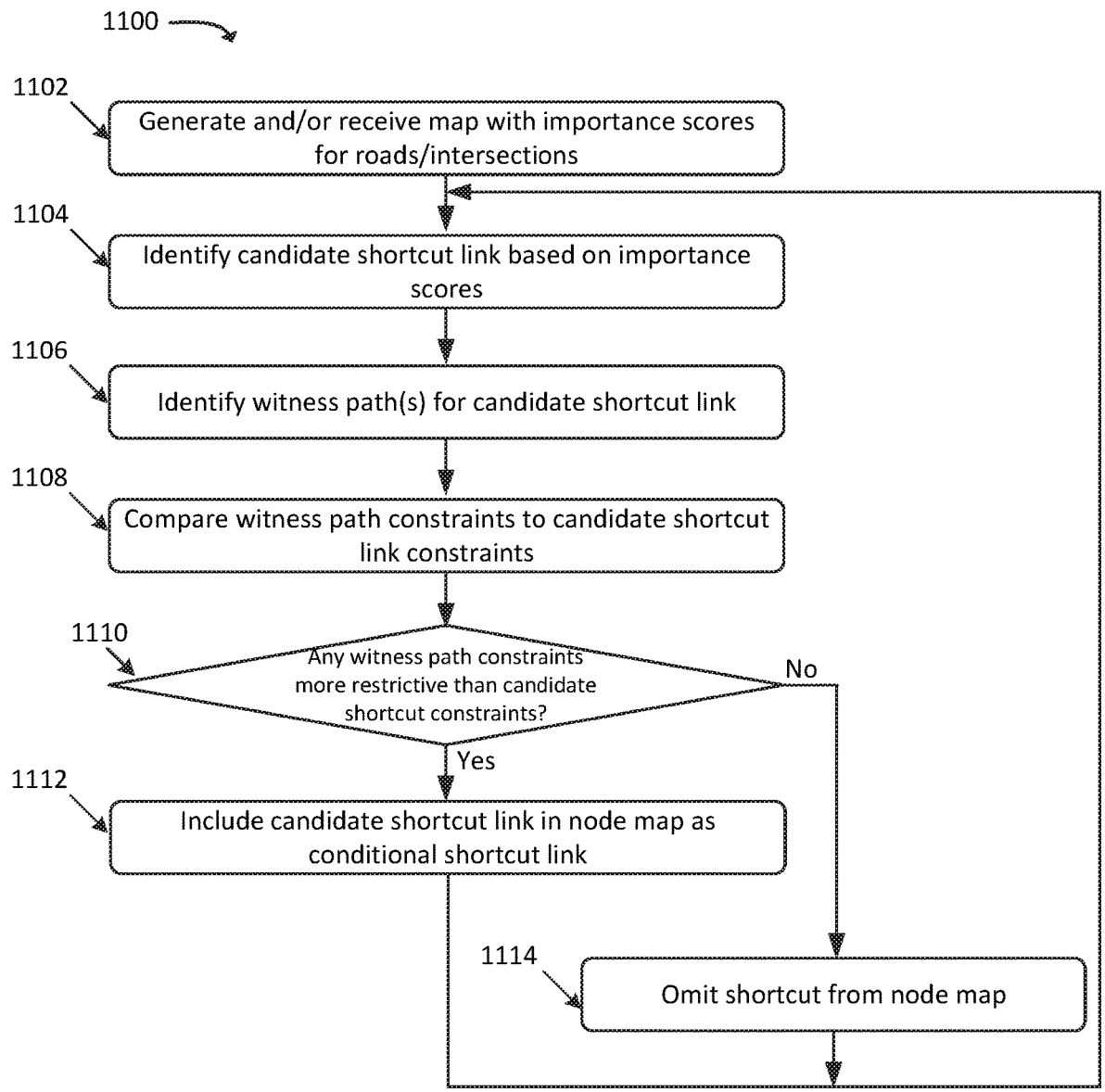
FIG. 11 illustrates an example process for using contraction hierarchy techniques to generate a node map with one or more conditional shortcut links, in accordance with some embodiments.

FIG. 11 illustrates an example process 1100 for evaluating and including conditional shortcut links in a node map. In some embodiments, some or all of process 1100 may be performed by CCH Navigation System 951. In some embodiments, one or more other devices may perform some or all of process 1100 in concert with, and/or in lieu of, CCH Navigation System 951.

As shown, process 1100 may include generating and/or receiving (at 1102) a map with priority scores for roads and/or intersections depicted in the map. For example, CCH Navigation System 951 may receive a map (e.g., as similarly discussed above with respect to map 101). The map may be associated with roads and intersections, or other types of pathways. For example, in some embodiments, the map may be associated with pipelines, circuits, railway tracks, and/or other types of pathways that may be traversed. In some embodiments, CCH Navigation System 951 may determine and/or may receive importance scores for some or all of the roads and/or intersections. As noted above, importance scores may be associated with one or more factors of the roads and/or intersections. For example, a road with a relatively "low" importance may be a relatively small road, may have a relatively small traffic volume, may be a residential road, and/or may have other suitable attributes. As another example, a road with a relatively "high" importance may be a relatively large road (e.g., a large quantity of lanes, a relatively long length, etc.), may have a relatively large traffic volume, may be a highway, and/or may have other suitable attributes.

Process 1100 may further include identifying (at 1104) a candidate shortcut link based on the importance scores. In some embodiments, CCH Navigation System 951 may identify a candidate shortcut link based on one or more factors in addition to, or in lieu of, importance scores. For the sake of brevity, importance scores are discussed herein as the factor based on which candidate shortcut links are identified. For example, CCH Navigation System 951 may identify one or more links (e.g., a single link or a series of links) with relatively low importance scores. For example, CCH Navigation System 951 may identify one or more links with importance scores below a threshold, and/or may identify one or more links that have a lowest importance score (or set of importance scores) and that have not yet been analyzed. For example, as discussed below, some or all of process 1100 may be performed iteratively, and CCH Navigation System 951 may perform iterations in a sequence that is based on ascending importance scores of links or sets of links.

Process 1100 may additionally include identifying (at 1106) one or more witness paths for the candidate shortcut link. For example, CCH Navigation System 951 may identify one or more paths, which do not include a path through the candidate shortcut link, that have a lower cost than a candidate shortcut path. As noted above, the "candidate shortcut path" may include a path through the candidate shortcut link. In some embodiments, the candidate shortcut path may include only the shortcut link. As similarly noted above, the candidate shortcut link may be evaluated in a single direction, or in multiple directions.

Although not discussed here, situations may arise where a witness path is not identified for a given candidate shortcut link. In such situations, CCH Navigation System 951 may add the candidate shortcut link to the node map. For example, the candidate shortcut link may be added, as the absence of a valid witness link may indicate that the shortcut link is an optimal path between the starting and ending nodes of the candidate shortcut link. For the sake of example, the description of process 1100 assumes that one or more witness paths are found (at 1106) for the candidate shortcut link.

Process 1100 may also include comparing (at 1108) constraints associated with the identified witness path(s) to constraints associated with the candidate shortcut link. For example, as discussed above, the constraints of a given witness path may include the subsumed constraints of one or more links of the witness path. For example, if the witness path includes a first link with a maximum height restriction of 10 m, and a second link with a maximum height restriction of 8 m (a more restrictive constraint), then the witness path may have a subsumed maximum height restriction of 8 m. As another example, the subsumed constraints may include constraints of different types of parameters. For example, if the witness path includes a link with a maximum height restriction and a maximum weight restriction, the witness path may have the maximum height restriction and the maximum weight restriction. As another example, if the witness path includes a first link with a maximum height restriction and a second link with a maximum weight restriction, the witness path may have the maximum height restriction and the maximum weight restriction. As yet another example, if the witness path includes a first link with a maximum height restriction of 10 m and a maximum weight restriction of 5,000 kilograms ("kg"), and a second link with a maximum height restriction of 8 m and a maximum weight restriction of 6,000 kg, the witness path may have the maximum height restriction of 8 m and the maximum weight restriction of 5,000 kg. That is, the witness path may have the most restrictive of each type of constraint, even if the more restrictive constraint for each type is associated with a different link.

As discussed above, a first constraint may be considered "more restrictive" than a second constraint if the first constraint may be violated while the second constraint is not violated. On the other hand, a first constraint may be considered "less restrictive" than a second constraint if the first constraint may not be violated while the second constraint may be violated. Further, as discussed above, some links or paths may not be associated with any constraints.

Process 1100 may further include determining (at 1110) whether any witness path constraints are more restrictive than constraints of the candidate shortcut link. If one or more witness paths are associated with constraints that are more restrictive than constraints of the candidate shortcut link (at 1110—YES), then process 1100 may additionally comprise including (at 1112) the candidate shortcut link the node map as a conditional shortcut link. For example, CCH Navigation System 951 may include the shortcut link in the node map, along with information indicating the one or more constraints associated with the candidate link. In this manner, as discussed below, the shortcut link may be available when evaluating the node map against a query, such as a navigation-related query that includes parameters against which the constraints may be evaluated. Such query parameters may, for example, be parameters associated with a vehicle for which navigation directions are requested.

If, on the other hand, no constraints of the witness path are more restrictive than the constraints of the candidate shortcut link (at 1110—NO), then process 1100 may include omitting (at 1114) the candidate shortcut link from the node map. For example, CCH Navigation System 951 may forgo including the shortcut link from the node map. CCH Navigation System 951 may further store an indication that the candidate shortcut link is associated with one or more witness paths that are less restrictive than the candidate shortcut path, and/or some other suitable indication that the candidate shortcut path should not be included in the node map. Such indication may allow CCH Navigation System 951 to forgo subsequent iterations of process 1100, or some other suitable process, for the candidate shortcut link, as the determination (at 1110—NO) may indicate that the candidate shortcut link should not be added. For example, as noted above, the determination (at 1110—NO) that a less restrictive (or as restrictive) witness path exists for the candidate shortcut link may indicate that the candidate shortcut link is not necessary, as the less costly and less restrictive witness path would be selected in all (or nearly all) situations in favor of the candidate shortcut link when evaluating the node map against a query.

As indicated by the arrows from blocks 1112 and 1114 to 1104, some or all of process 1100 may be repeated in an iterative manner. For example, CCH Navigation System 951 may identify (at 1104) another candidate shortcut link based on importance scores or other suitable criteria. As noted above, for example, CCH Navigation System 951 may identify candidate shortcut links in a sequence based on ascending importance scores or in some other sequence. In some embodiments, CCH Navigation System 951 may use a random or pseudorandom selection process to identify candidate shortcut links. In some embodiments, process 1100 may repeat until CCH Navigation System 951 has evaluated all available candidate shortcut links, until a threshold quantity of iterations have been performed, until all candidate shortcut links with importance scores below a threshold have been evaluated, and/or until some other suitable criteria has been met.

Figure 12:
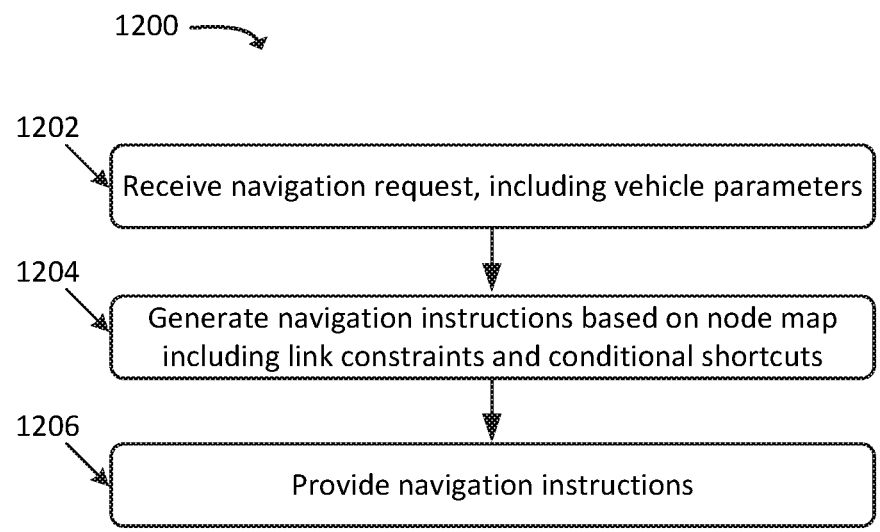
FIG. 12 illustrates an example process for using a node map, including one or more conditional shortcut links, to generate navigation instructions in response to a navigation request.

FIG. 12 illustrates an example process 1200 for using a node map, including one or more conditional shortcut links, to generate navigation instructions in response to a navigation request. In some embodiments, some or all of process 1200 may be performed by CCH Navigation System 951. In some embodiments, one or more other devices may perform some or all of process 1200 in concert with, and/or in lieu of, CCH Navigation System 951.

As shown, process 1200 may include receiving (at 1202) a navigation request, including vehicle parameters. For example, CCH Navigation System 951 may receive a request to navigate from a particular node, in a node map (e.g., as generated according to process 1100 or some other suitable process), to another node in the node map. As discussed above, the node map may include one or more conditional shortcut links, and/or may include constraints associated with one or more links between nodes.

Process 1200 may further include generating (at 1204) navigation instructions based on the node map. For example, CCH Navigation System 951 may use a bidirectional search to identify one or more paths from the starting node to the ending node. For example, CCH Navigation System 951 may perform one or more searches originating from the starting node and/or the ending node. In some embodiments, the bidirectional search may include identifying nodes or paths that have a higher importance score than a present node, and iteratively continuing to search for nodes or paths with higher importance score than the present node. In this manner, one or more paths originating from the starting node may intersect with one or more paths originating from the ending node, and CCH Navigation System 951 may select a particular complete path (e.g., an intersection of a path originating from the starting node and a path originating from the ending node) based on cumulative cost and/or one or more other factors.

For example, the one or more other factors may include constraints associated with the identified paths and the query parameters. For example, the vehicle parameters (indicated at 1202) may include a vehicle height, weight, quantity of axles, and/or other parameters. As noted above, the node map may include constraints associated with links. In some situations, a relatively less costly path may be impassable by a particular vehicle, while a more costly conditional shortcut link may be passable by the particular vehicle. That is, in such situations, the conditional shortcut link may be less restrictive (and therefore a valid navigation solution) than a less costly path that may be passable by other vehicles.

Process 1200 may additionally include providing (at 1206) the navigation instructions. For example, CCH Navigation System 951 may provide an indication of the path (determined at 1204) to a requesting device, such as UE 901. UE 901 may, in turn, present the navigation instructions via a display screen, audibly present the navigation instructions, or perform one or more other suitable operations to present the navigation instructions.

Figure 13:
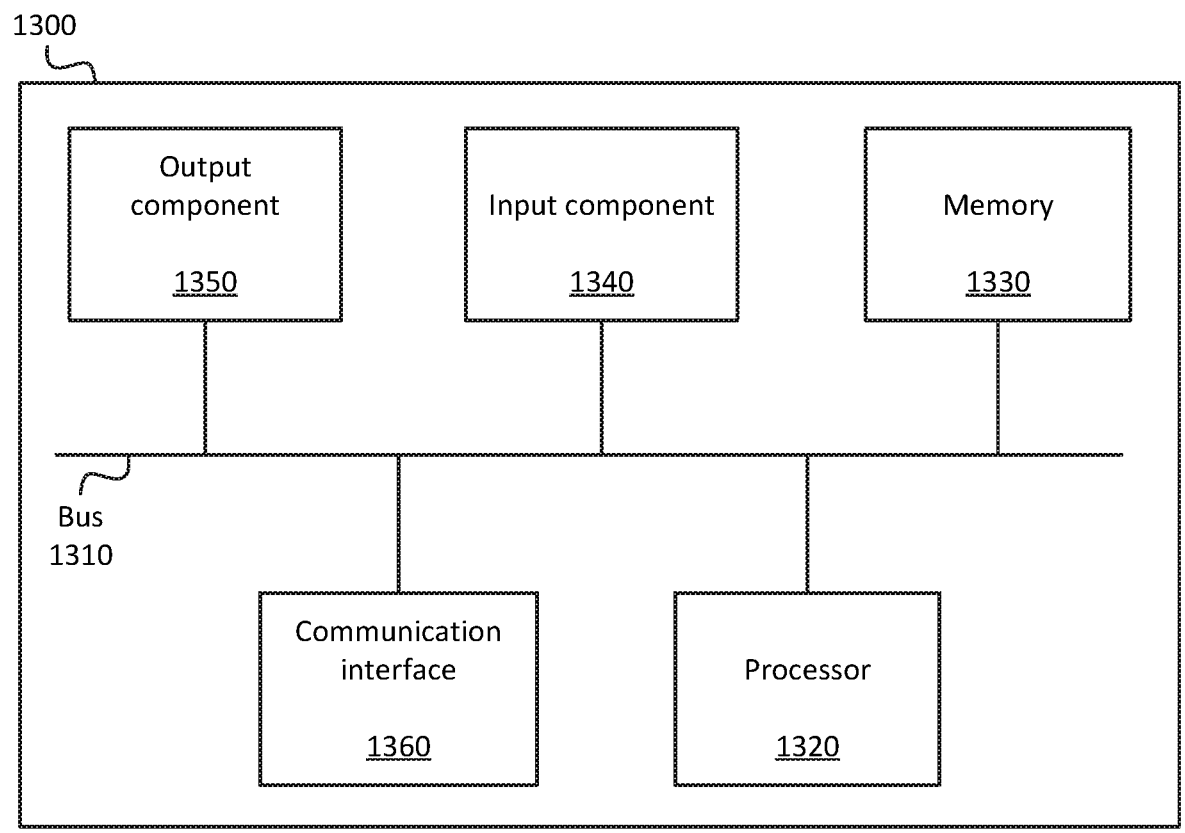
FIG. 13 illustrates example components of one or more devices, in accordance with one or more embodiments described herein.

FIG. 13 illustrates example components of device 1300. One or more of the devices described above may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300 and/or other receives or detects input from a source external to 1340, such as a touchpad, a touchscreen, a keyboard, a keypad, a button, a switch, a microphone or other audio input component, etc. In some embodiments, input component 1340 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-8, 11, and 12), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
    one or more processors configured to:
        receive information regarding a plurality of nodes and links between the plurality of nodes, wherein the information regarding the plurality of nodes and links includes:
            a cost associated with each link of the plurality of links, and
            a constraint associated with at least one link of the plurality of links;
        generate a candidate shortcut link based on at least two links of the plurality of links, wherein the shortcut link is a link between a first node, of the at least two links, and a second node of the at least two links;
        generate a witness path from the first node to the second node, wherein generating the witness path includes determining that a cost of the witness path is less than a cost of the candidate shortcut link;
        determine, based on the constraints associated with the at least one links of the plurality of links, whether the witness path is more restrictive than the candidate shortcut path;
        generate a node map that includes one or more of the plurality of nodes and links, wherein generating the node map includes:
            omitting the candidate shortcut link from the node map when determining that the witness path is not more restrictive than the candidate shortcut path; and
            including the candidate shortcut link in the node map when determining that the witness path is more restrictive than the candidate shortcut path;
        receive a request for a path from a third node in the node map to a fourth node in the node map; and
        determine, based on the request, a path from the third node to the fourth node, wherein determining the path includes selecting a particular set of nodes or links from the nodes and links included in the node map.

2. The device of claim 1, wherein the query includes one or more query parameters, wherein determining the path from the third node to the fourth node includes comparing the constraint associated with the at least one link of the plurality of links to the one or more query parameters.

3. The device of claim 1, wherein the witness path is associated with a particular constraint that is violated by a particular parameter, wherein determining that the witness path is more restrictive than the candidate shortcut path includes determining that the candidate shortcut path is not associated with a respective constraint that is violated by the particular parameter.

4. The device of claim 1, wherein the candidate shortcut path is associated with a particular constraint that is violated by a particular parameter, wherein determining that the witness path is not more restrictive than the candidate shortcut path includes determining that the witness path is not associated with a respective constraint that is violated by the particular parameter.

5. The device of claim 1, wherein the candidate shortcut link is included in the node map, wherein the at least two links, on which the candidate shortcut link is based, are included in the node map.

6. The device of claim 1, wherein generating the witness path includes identifying respective costs of a plurality of links, that correspond to the witness path, between the first node and the second node, wherein the cost of the witness path is based on the costs of the plurality of links that correspond to the witness path.

7. A non-transitory computer-readable medium, storing a plurality of processor-executable instructions to:
    receive information regarding a plurality of nodes and links between the plurality of nodes, wherein the information regarding the plurality of nodes and links includes:
        a cost associated with each link of the plurality of links, and
        a constraint associated with at least one link of the plurality of links;

generate a candidate shortcut link based on at least two links of the plurality of links, wherein the shortcut link is a link between a first node, of the at least two links, and a second node of the at least two links;

generate a witness path from the first node to the second node, wherein generating the witness path includes determining that a cost of the witness path is less than a cost of the candidate shortcut link;

determine, based on the constraints associated with the at least one links of the plurality of links, whether the witness path is more restrictive than the candidate shortcut path;

generate a node map that includes one or more of the plurality of nodes and links, wherein generating the node map includes:

omitting the candidate shortcut link from the node map when determining that the witness path is not more restrictive than the candidate shortcut path; and including the candidate shortcut link in the node map when determining that the witness path is more restrictive than the candidate shortcut path;

receive a request for a path from a third node in the node map to a fourth node in the node map; and determine, based on the request, a path from the third node to the fourth node, wherein determining the path includes selecting a particular set of nodes or links from the nodes and links included in the node map.

8. The non-transitory computer-readable medium of claim 7, wherein the query includes one or more query parameters, wherein determining the path from the third node to the fourth node includes comparing the constraint associated with the at least one link of the plurality of links to the one or more query parameters.

9. The non-transitory computer-readable medium of claim 7, wherein the witness path is associated with a particular constraint that is violated by a particular parameter, wherein determining that the witness path is more restrictive than the candidate shortcut path includes determining that the candidate shortcut path is not associated with a respective constraint that is violated by the particular parameter.

10. The non-transitory computer-readable medium of claim 7, wherein the candidate shortcut path is associated with a particular constraint that is violated by a particular parameter, wherein determining that the witness path is not more restrictive than the candidate shortcut path includes determining that the witness path is not associated with a respective constraint that is violated by the particular parameter.

11. The non-transitory computer-readable medium of claim 7, wherein the candidate shortcut link is included in the node map, wherein the at least two links, on which the candidate shortcut link is based, are included in the node map.

12. The non-transitory computer-readable medium of claim 7, wherein generating the witness path includes identifying respective costs of a plurality of links, that correspond to the witness path, between the first node and the second node, wherein the cost of the witness path is based on the costs of the plurality of links that correspond to the witness path.

13. A method, comprising:
receiving information regarding a plurality of nodes and links between the plurality of nodes, wherein the information regarding the plurality of nodes and links includes:

a cost associated with each link of the plurality of links, and a constraint associated with at least one link of the plurality of links;

generating a candidate shortcut link based on at least two links of the plurality of links, wherein the shortcut link is a link between a first node, of the at least two links, and a second node of the at least two links;

generating a witness path from the first node to the second node, wherein generating the witness path includes determining that a cost of the witness path is less than a cost of the candidate shortcut link;

determining, based on the constraints associated with the at least one links of the plurality of links, whether the witness path is more restrictive than the candidate shortcut path;

generating a node map that includes one or more of the plurality of nodes and links, wherein generating the node map includes:

omitting the candidate shortcut link from the node map when determining that the witness path is not more restrictive than the candidate shortcut path; and including the candidate shortcut link in the node map when determining that the witness path is more restrictive than the candidate shortcut path;

receiving a request for a path from a third node in the node map to a fourth node in the node map; and determining, based on the request, a path from the third node to the fourth node, wherein determining the path includes selecting a particular set of nodes or links from the nodes and links included in the node map.

14. The method of claim 13, wherein the witness path is associated with a particular constraint that is violated by a particular parameter, wherein determining that the witness path is more restrictive than the candidate shortcut path includes determining that the candidate shortcut path is not associated with a respective constraint that is violated by the particular parameter.

15. The method of claim 13, wherein the candidate shortcut path is associated with a particular constraint that is violated by a particular parameter, wherein determining that the witness path is not more restrictive than the candidate shortcut path includes determining that the witness path is not associated with a respective constraint that is violated by the particular parameter.

16. The method of claim 13, wherein the candidate shortcut link is included in the node map, wherein the at least two links, on which the candidate shortcut link is based, are included in the node map.

17. The method of claim 13, wherein generating the witness path includes identifying respective costs of a plurality of links, that correspond to the witness path, between the first node and the second node, wherein the cost of the witness path is based on the costs of the plurality of links that correspond to the witness path.

18. The method of claim 13, wherein the node map is generated prior to receiving the request for the path from the third node to the fourth node.

19. The device of claim 1, wherein the node map is generated prior to receiving the request for the path from the third node to the fourth node.

20. The non-transitory computer-readable medium of claim 7, wherein the node map is generated prior to receiving the request for the path from the third node to the fourth node.

* * * * *